United States Patent [19]

Jackson

[11] Patent Number: 4,478,020
[45] Date of Patent: Oct. 23, 1984

[54] WINDOW REVEAL MOLDING

[75] Inventor: Norman C. Jackson, Livonia, Mich.

[73] Assignee: The Standard Products Company, Cleveland, Ohio

[21] Appl. No.: 330,846

[22] Filed: Dec. 15, 1981

[51] Int. Cl.³ .......................... E04C 2/38; E04C 5/07
[52] U.S. Cl. .................................. 52/309.13; 52/397;
52/403; 52/468; 52/717; 428/31
[58] Field of Search ................ 52/397, 398, 399, 400,
52/208, 717, 396, 403, 462, 309.13, 465, 468;
428/31, 121; 24/208 A; 46/157

[56] References Cited

U.S. PATENT DOCUMENTS

| 2,230,688 | 2/1941 | Irwin | 52/396 X |
| 3,378,958 | 4/1968 | Parks et al. | |
| 3,608,254 | 9/1971 | Sklamberg et al. | 52/396 X |
| 3,759,004 | 9/1973 | Kent | 52/403 X |
| 3,851,432 | 12/1974 | Griffin | |
| 4,035,017 | 7/1977 | Griffin et al. | |
| 4,165,119 | 8/1979 | Hedeen et al. | |
| 4,358,917 | 11/1982 | Oda et al. | 52/468 X |

FOREIGN PATENT DOCUMENTS

| 553707 | 1/1957 | Belgium | 52/403 |
| 1131642 | 10/1956 | France | 52/468 |

Primary Examiner—Alfred C. Perham
Attorney, Agent, or Firm—Harness, Dickey & Pierce

[57] ABSTRACT

An elongated sealing and decorative gasket having a head portion and a mounting portion, the head portion being adapted to cover a channel into which the mounting portion is inserted and the mounting portion having a shape, in cross-section, generally of a diamond with an open center.

19 Claims, 5 Drawing Figures

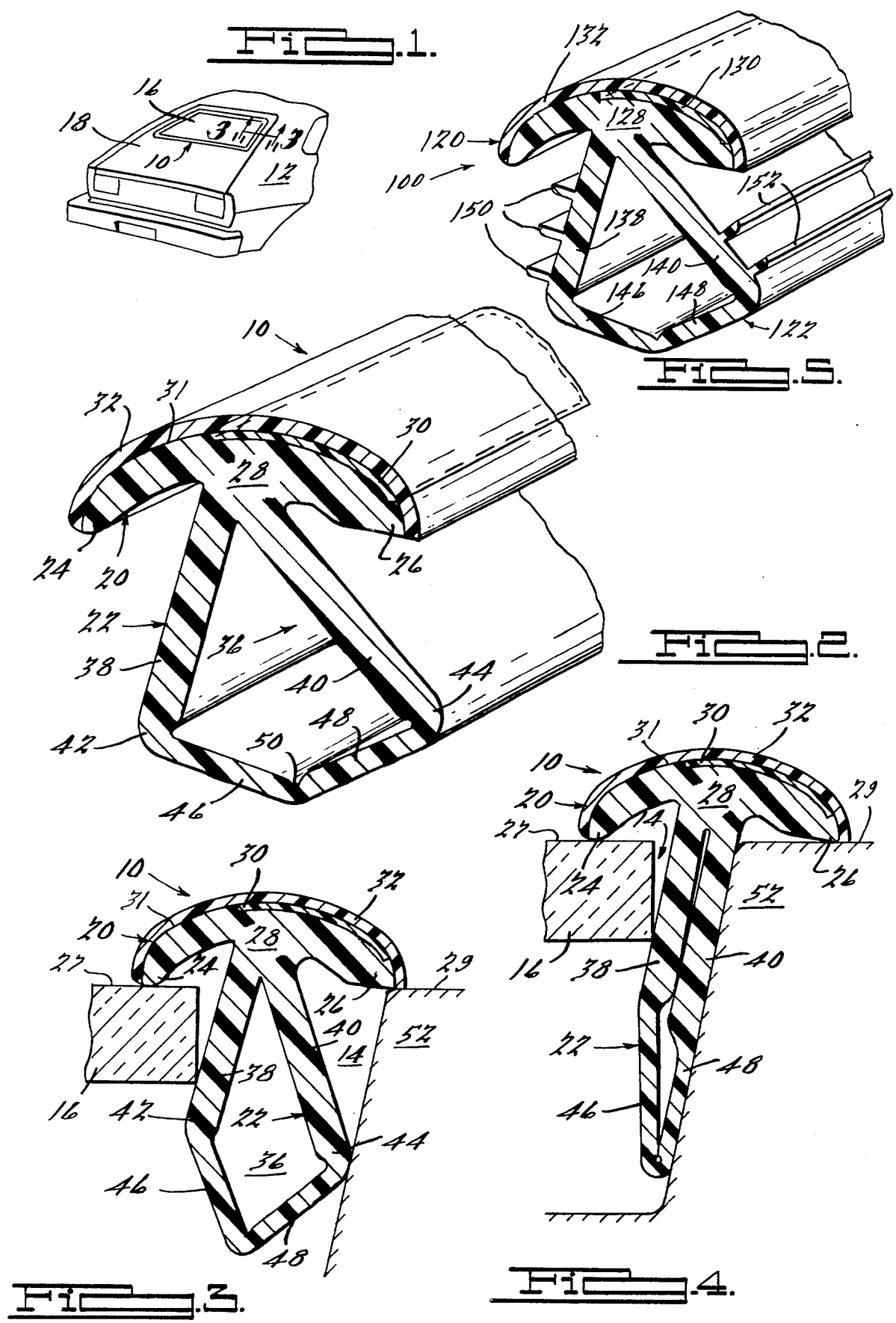

WINDOW REVEAL MOLDING

BACKGROUND AND SUMMARY OF THE INVENTION

The present invention relates to a molding adapted to cover and seal an elongated gap when partially inserted therein. More particularly, the present invention relates to a sealing and decorative molding for use with an automotive vehicle and especially adapted to cover and seal the open space or channel which extends around the periphery of a fixed glass window between the glass and associated body part of the automotive vehicle.

In the manufacture of automotive vehicles, fixed glass windows are commonly mounted on an automotive body part, such as a rearwardly facing hatch, with a space or channel extending around the perimeter of the fixed glass window to provide tolerance in the relative sizing of the glass and the frame of the body part in which it is mounted. This channel facilitates installation of the glass in the frame and accommodates differences in expansion between the glass and body part. On the other hand, the channel is unsightly and provides a place for dirt, water, snow and the like to accumulate. Hence, an elongated gasket is conventionally inserted into the channel to cover and seal against the elements and to improve its visual appearance and hence that of the vehicle. A closely fitting, securely retained and centered gasket, however, may not be achieved where the channel is curved or where the glass and frame do not have coplanar outwardly facing surfaces on opposite sides of the channel or where the channel is of various widths. Thus, there remains a need for an improved gasket having mounting or retention means which provides secure retention and sealing as well as good appearance and is tolerant of curved channels, non-coplanar glass and frame parts and channels of varying widths.

In accordance with the present invention, an elongated sealing and decorative gasket which is especially well adapted for use on automotive vehicles comprises a head portion having an outwardly facing decorative surface and a mounting portion which is generally diamond shaped with a hollow center in transverse cross-section. The head portion is adapted to cover and seal the opening of a channel into which the mounting portion is inserted. The mounting portion has side walls extending divergingly away from the head portion with and divergent edges joined by a biasing wall.

BRIEF DESCRIPTION OF THE DRAWINGS

FIG. 1 is a perspective view, partially in section and broken away, showing a molding of the present invention in operative association with an automobile;

FIG. 2 is a perspective view, partially in section and broken away, of a molding of this invention;

FIG. 3 is a cross-sectional view, broken away, taken along line 3—3 in FIG. 1;

FIG. 4 is a cross-sectional view similar to that of FIG. 3 but showing a molding of the present invention disposed in a narrow channel; and FIG. 5 is a perspective view, partially in section and broken away, of an alternative molding of this invention.

DESCRIPTION OF THE PREFERRED EMBODIMENTS

Now referring to the drawings, FIGS. 1 through 4 show a preferred embodiment of a sealing and decorative molding of the present invention which is indicated generally by the numeral 10. In FIG. 1, molding 10 is illustrated in use on automotive vehicle 12. More specifically, molding 10 is shown in a sealing and decorative position around the perimeter edge of fixed glass window 16 of hatch 18. As shown in FIGS. 1 and 3, molding 10 is mounted in channel 14 which is defined by the gap between the outer perimeter edge of window 16 and the inwardly facing surface of the associated window frame of hatch 18 into which window 16 is set. Molding 10 is adapted to seal channel 14 against weather elements and the like and to provide a decorative trim extending around the perimeter of window 16 while concealing the opening of channel 14.

Now referring to FIG. 2, the construction of molding 10 is shown in more detail. Generally, molding 10 is an elongated strip with a head portion 20 and a mounting portion 22. Head portion 20 is of greater transverse width than channel 14 and thus has sufficient transverse width to extend across the width of channel 14 to function as a cover thereover. In addition, head portion 20 has an outwardly facing decorative surface, facing upwardly in FIGS. 2–4, which presents a pleasing appearance when viewed in mounted position. Mounting portion 22 is constructed so as to be insertable into channel 14 and once so inserted, to serve a mounting, i.e., retention, function to secure molding 10 in position in channel 14.

Head portion 20 is an elongated strip which is umbrella shaped in transverse cross-section and has a body 28 which is comprised of a flexible resilient material, for example, black polyvinylchloride having a durometer hardness of 40 Shore "D" (15 sec. reading) or a thermoplastic elastomer material. Body 28 has downwardly turned lateral edge portions 24 and 26 which are adapted to extend along and sealingly engage surfaces 27 and 29 on opposite sides of channel 14. Also, body 28 has an outwardly facing decorative surface 31 which preferably includes a portion presenting a metallic appearance. Thus, as shown in the figures, body 28 carries a bright strip 30, such as a metallized polyester strip, which presents a metallic appearance to the viewer and thereby enhances the visual appearance of molding 10. A protective, transparent layer 32 is laminated over bright strip 30 and surface 31. Transparent layer 32 can suitably comprise a clear polyvinylchloride material of 55 Shore "D" (15 sec. reading) durometer hardness or an ionomer resin material such as Surlyn ®. Body 28, bright strip 30, and transparent layer 32 can be extruded and laminated in any conventional manner. Body 28 is, however, preferably extruded integrally with mounting portion 22.

Mounting portion 22 is an elongated tube which is somewhat diamond shaped in cross-section and has a hollow interior 36 enclosed by first and second side walls 38 and 40 and biasing walls 46 and 48. Mounting portion 22 is comprised of flexible resilient material and can be comprised of the same material as body 28 of head portion 20. Side walls 38 and 40 are elongated walls having adjacent lateral edges joined together at body 28 of head portion 20 and extend divergingly away from body 28. The divergent lateral edges 42 and 44 of side walls 38 and 40 respectively, are connected by means for biasing side walls 38 and 40 in a diverging direction. Thus, lateral edge 42 of wall 38 is connected to biasing wall 46 and lateral edge 44 of wall 40 is connected to biasing wall 48. Biasing walls 46 and 48 have inner lateral edges joined at 50. It will, of course, be appreciated that side walls 38 and 40 and biasing walls 46 and 48 can be integrally formed, for example, by conventional extrusion methods. It will be appreciated that biasing walls 46 and 48 can be considered as parts of a single biasing wall which provides biasing means for side walls 38 and 40 in a divergent direction. The wall thickness at joined wall edges can be reduced as shown in the figures to facilitate angular movement of one wall with respect to the other. Side walls 38 and 40 can be of the same height, however, and as illustrated in the figures, it is preferable that one of side walls 38 and 40 be of greater height than the other. Such an assymetrical construction offers advantages in use of molding 10 and allows greater accommodation of different sizes and/or misaligned window and frame parts. Thus, side wall 40 has a greater height than side wall 38, although the total height of side wall 40 and its adjacent biasing wall 48 equals that of side wall 38 and is adjacent biasing wall 46 to facilitate use of molding 10 in narrow channels as illustrated in FIG. 4.

As is illustrated in FIGS. 3 and 4, the diamond-shaped wall arrangement of mounting portion 22 facilitates the centering of molding 10 within channel 14 and allows accommodation of substantially varying widths of channel 14. In FIG. 3, a normal width of channel 14 is shown. In FIG. 4, a narrow width of channel 14 is shown. The difference in widths is easily accommodated by mounting portion 22 since side walls 38 and 40 can flex inwardly toward each other.

For use in curved channels such as around corners of windows, the use of assymetrical side walls reduces the tendency of a lateral edge of the head portion of molding 10 to lift up and break sealing contact with frame 52. In this case, longer side wall 40 should be positioned adjacent frame 52 while shorter side wall 38 is adjacent window 16. On the other hand, where fixed glass 16 is positioned well inset into frame 52, it may be desired to reverse the locations of side walls 38 and 40 so that 40 is disposed on the window of channel 14. In this manner, the longer length of the leg adjacent to glass 16 facilitates this leg catching under glass 16 to assist in retaining the molding within the channel.

Additional retention means for retaining a molding of this invention in a channel can be provided on the side walls of the mounting portion thereof, for example, as is shown in the alternative embodiment of FIG. 5. Thus, molding 100 shown in FIG. 5 is generally of a construction analogous to molding 10, having a head portion 120 and a mounting portion 122. Head portin 120 is of the same construction as head portion 20 of molding 10 and has a body 128 which carries a bright strip 130 and a protective transparent layer 132. Mounting portion 122 includes additional rib-like retention means as described in more detail below.

Mounting portion 122 of molding 100 is of a construction generally analogous to mounting portion 22 of molding 10 and thus has an elongated tube which is diamond shaped in cross-section and formed by side walls 138 and 140 and biasing walls 146 and 148. Mounting portion 122 is comprised of flexible resilient material and, can be comprised of the same material as body 128 of head portion 120. Side walls 138 and 140 and biasing walls 146 and 148 are of the same structure and function as the corresponding side walls 38 and 40 and biasing walls 46 and 48 of molding 10 except that a plurality of elongated ribs extend laterally outwardly from each of side walls 138 and 140. Three ribs 150 extend generally laterally outwardly from side wall 138 while two ribs 152 extend generally laterally outwardly from side wall 140. Ribs 150 and 152 can be made of the same material as mounting portion 122 generally and can be simultaneously formed with mounting portion 122 by conventional extrusion through a die having the appropriate cross-sectional shape. It will, of course, be appreciated that the number of ribs 150 or 152 can be one or more and can vary depending upon the particular use intended for molding 100. It will further be appreciated that ribs 150 and 152 can serve as additional retention means by catching under an edge or the like or by presenting ribs having lateral edges which engage channel walls to improve the frictional retention of mounting portion 122 therein.

Thus, in accordance with the present invention a sealing and decorative molding is provided which is well adapted for use with channels of various widths, around curved channels, and with channels having flush and nonflush upper surfaces. The molding can be easily inserted into the channel, and once inserted, is securely retained therein. It will, of course, be readily apparent to one skilled in the art that the inventive concept of the present invention is subject to modification and variation. Therefore, it will be understood that the present invention may be modified or varied within the scope of the appended claims without departing from the spirit of this invention.

What is claimed is:

1. An elongated molding having a head portion and a mounting portion, said mounting portion having a hollow interior enclosed by resilient walls and being generally diamond-shaped in cross-section, each of said resilient walls comprising a pair of side walls connected to said head portion and diverging outwardly therefrom and a biasing wall with each opposite lateral edge connected to a divergent lateral edge of one of said side walls, one of said pair of side walls having a greater height than the other of said pair.

2. A molding as in claim 1 wherein said biasing wall comprises a pair of biasing walls with adjacent lateral side edges connected.

3. A molding as in claim 2 wherein, in use, said head portion has a transverse width greater than said mounting portion.

4. A molding as in claim 3 wherein said head portion has lateral edge portions extending downwardly toward said mounting portion.

5. A molding as in claim 4 wherein said head portion is generally umbrella shaped in cross-section.

6. A molding as in claim 3 wherein said head portion has a bright metallic strip on a surface thereof exposed to view.

7. A molding as in claim 6 wherein said head portion and said mounting portion are made of resilient polyvinylchloride.

8. A molding as in claim 3 wherein the combined height of one of said side walls and the biasing wall adjacent thereto is generally equal to the combined height of the other of said side walls and the biasing wall adjacent thereto.

9. An elongated molding having a head portion and a mounting portion, said mounting portion having a hollow interior enclosed by resilient walls and being generally diamond-shaped in cross-section, said walls comprising a pair of side walls connected to said head portion and diverging outwardly therefrom and a biasing wall with each opposite lateral edge connected to a divergent lateral edge of one of said side walls, one of said side walls having a greater height than the other of said side walls, and each side wall further having at least one elongated rib extending laterally outwardly therefrom.

10. A molding as in claim 9 wherein each of said side walls has a plurality of elongated ribs extending laterally outwardly therefrom.

11. A molding as in claim 10 wherein said biasing wall comprises a pair of biasing walls with adjacent lateral side edges connected.

12. A molding as in claim 11 wherein, in use, said head portion has a transverse width greater than said mounting portion.

13. A molding as in claim 12 wherein said head portion has lateral edge portions extending downwardly toward said mouting portion.

14. A molding as in claim 13 wherein said head portion is generally umbrella shaped in cross-section.

15. A molding as in claim 12 wherein said head portion has a bright metallic strip on a surface thereof exposed to view.

16. A molding as in claim 15 wherein said head portion and said mounting portion are made of resilient polyvinylchloride.

17. A molding as in claim 12 wherein the combined height of one of said side walls and the biasing wall adjacent thereto is generally equal to the combined height of the other of said side walls and the biasing wall adjacent thereto.

18. A molding as in claim 17 wherein one of said side walls has three of said ribs and the other of said side walls has two of said ribs.

19. A molding as in claim 18 wherein the side wall of greater height has three of said ribs and the side wall of lesser height has two of said ribs.

* * * * *